Dec. 20, 1960  R. J. HULL  2,964,915
NATURAL GAS TREATMENT
Filed Dec. 9, 1957  2 Sheets-Sheet 1
FIG. 1.
FIG. 2.
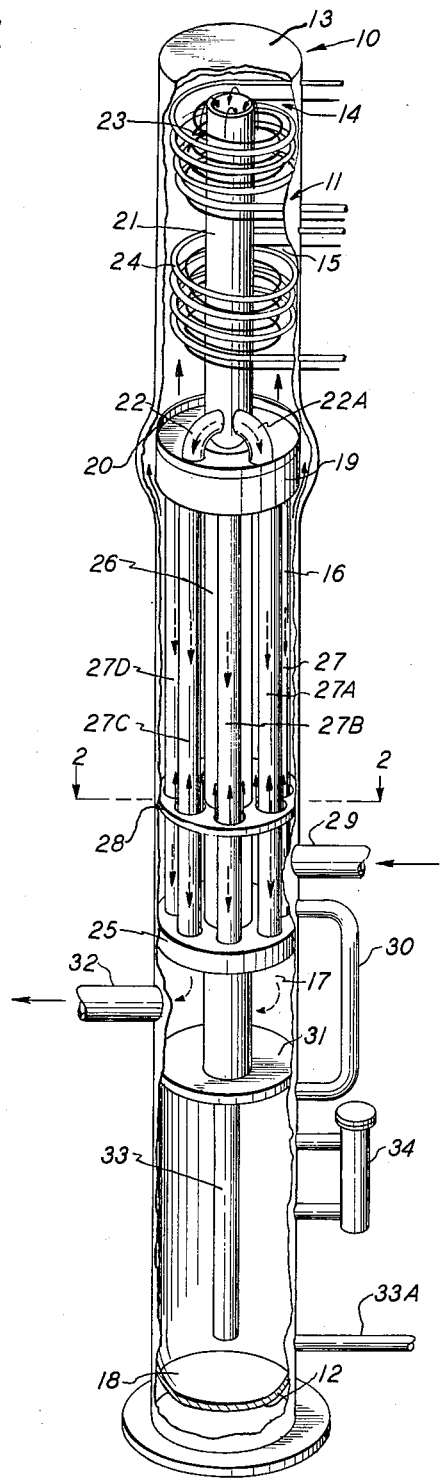
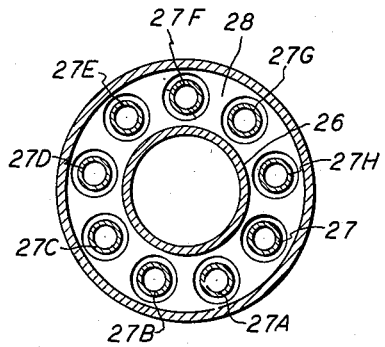
INVENTOR.
RAYMOND JAMES HULL
BY
*Christie, Parker & Hale*
ATTORNEYS Dec. 20, 1960 — R. J. HULL — 2,964,915
NATURAL GAS TREATMENT
Filed Dec. 9, 1957 — 2 Sheets-Sheet 2

INVENTOR.
RAYMOND JAMES HULL
BY
Christie, Parker & Hale
ATTORNEYS

United States Patent Office 2,964,915
Patented Dec. 20, 1960

2,964,915

NATURAL GAS TREATMENT

Raymond James Hull, Orange, Calif., assignor to Gas Processing Inc., Fullerton, Calif., a corporation of California Filed Dec. 9, 1957, Ser. No. 701,581

12 Claims. (Cl. 62—24)

This invention relates to natural gas treatment and particularly to a treating apparatus in which water and condensable hydrocarbons are removed from natural gas. It also relates to a process for the treatment of natural gas for the removal of water and the recovery of condensable hydrocarbons.

The term "natural gas" refers to the gaseous mixture of hydrocarbon compounds produced from subterranean reservoirs. Such gas, particularly when found underground in association with oil, contains relatively large amounts of hydrocarbon constituents higher in molecular weight than propane and, in such state, is called wet natural gas. The wet gas may be processed to yield two products, one being "casinghead gas" or "natural gasoline," a liquid product composed of the more readily condensable hydrocarbons in the wet gas, and the other being dry natural gas. In addition, natural gas, as obtained at the well-head of a producing well, frequently contains condensable water.

The presence of condensable constituents in natural gas as it is produced requires that the gas be treated before it is placed in gas transmission systems. Otherwise, condensation of liquids occurs within pipelines with a consequent adverse effect on operations of the transmission system. In addition, the presence of both condensable hydrocarbons and water can result in the formation of gas hydrates within the pipeline with resultant reduction in the flow capacity of the transmission system. Further, natural gasoline is itself a valuable product so that its removal prior to sale of the natural gas is of economic benefit to the producer.

The process for treating natural gas generally used in conventional treating plants may be classified either as an absorption process or as a low-temperature recovery process.

The absorption process is particularly used in large capacity installations. After compression and cooling of the wet natural gas to condenser water temperature, hydrocarbon constituents are removed from the natural gas by a suitable absorption solvent. Removal of water from the gas requires the use of dehydrating agents such as the glycols.

The low-temperature recovery process, while better adapted for small capacity installations involves compression of the gas followed by cooling to low-temperatures and, generally, subsequent treatment with dehydrating agents. A regenerative cycle to recover the dehydrating agent must be included as part of such a process.

The expense of conventional gas treating plants causes many instances to arise where natural gas is wasted by venting to the atmosphere or it is not produced because the installation of a treating plant cannot be economically justified. This particularly occurs where the discovered gas reservoir is small in size, or its location is remote or the true capacity of the reservoir has not been sufficiently defined to show an economic balance in favor of a treating plant. Even though gas transmission facilities are available, the untreated natural gas cannot therefore be marketed.

A need exists for processing equipment designed so that the maximum number of treating steps are carried out in a single unit. In this manner, it would be possible not only to reduce the cost of gas treating equipment but to make such equipment semi-portable. Treating of natural gas could then be done under circumstances which preclude installation of large conventional gas treating plants.

My invention provides apparatus for the treatment of natural gas to remove the condensable hydrocarbons and water from the natural gas which apparatus includes a refrigerating rectifier comprising an outer shell forming within it a fluid-tight enclosure. A feed gas inlet is provided so that wet feed gas can flow into the enclosure. A first heat exchanger is provided within the enclosure to pre-cool the feed gas and thereby to remove by condensation a part of the condensable hydrocarbons and water in the wet gas. A second heat exchanger is also provided within the enclosure to further cool the feed gas and thereby to remove additional condensable hydrocarbons and water from the gas. A gas flow directing means causes the cold dry gas leaving the second heat exchanging means to flow within the first heat exchanging means in a direction counter to the flow of the wet feed gas so that it pre-cools the incoming feed gas. A gas outlet provides comunication with the interior of the first heat exchanger. A liquid outlet is provided in the lower part of the enclosure. The hydrocarbon condensate flows counter to the flow of the incoming feed gas so that the condensate is fractionated and stripped of high vapor-pressure hydrocarbon constituents by the warmer feed gas.

The invention also encompasses a process for the treatment of wet natural gas. The process comprises cooling the wet natural gas by flowing it over a heat exchanger and maintaining the heat exchanger at a temperature to thereby condense substantially all of the condensable hydrocarbons and water from the gas. The cooled gas is counter-flowed in heat transfer relation with incoming natural gas to pre-cool the incoming gas prior to its passage over the heat exchanger. The condensed hydrocarbons are simultaneously flowed in heat transfer relation and counter to the flow of the incoming natural gas to cause the relatively warm incoming gas to volatize high vapor-hydrocarbon constituents from the condensed hydrocarbons.

The passage of wet natural gas through the refrigerating rectifier of the invention removes both water and condensable hydrocarbons from the wet gas so that a dry natural gas, suitable for pipeline transmission, is produced. Furthermore, the hydrocarbons, condensed from the wet gas, are fractionated and stripped of some of the light, high vapor-pressure components, namely, methane, ethane and propane, within the rectifier by utilizing the heat of the incoming feed gas. The liquid hydrocarbon product thus obtained may thereupon be further stabilized, if desired, by treatment in a stabilizing column.

The apparatus of the invention possesses the advantages of economy and compactness. Even when the refrigerating rectifier is operated in conjunction with a sabilizing column, the cost for the natural gas treatment is considerably less than the cost of a conventional natural gas treating plant employing either the absorption process or the low-temperature recovery process. For example, as compared to the conventional low-temperature recovery process, approximately three-fifths as much refrigeration is required in the apparatus of the invention per gallon of hydrocarbon product recovered, These factors of economy and compactness permit utilization of the apparatus of the invention under circumstances and in locations where installation of a conventional gas treating plant would not be economically feasible.

The design of the refrigerating rectifier of the invention incorporates the heat and material balances required to enable proper treatment of the natural gas with a minimum demand for refrigerating capacity. In addition, the design of the flow path for both the gas and liquids within the rectifier minimizes the effect upon flow of gas hydrate formation. Within these limitations, however, the arrangement of the heat exchanging surfaces and the flow path of the fluids may be modified without departing from the basic concept of the invention.

Both the apparatus and process of the invention will be more clearly understood from the following description made in conjunction with drawings of a preferred embodiment of the refrigerating rectifier of the invention in which:

Fig. 1 is a perspective view of the refrigerating rectifier according to the invention;

Fig. 2 is a section taken along line 2—2 of Fig. 1; and

Figure 3:
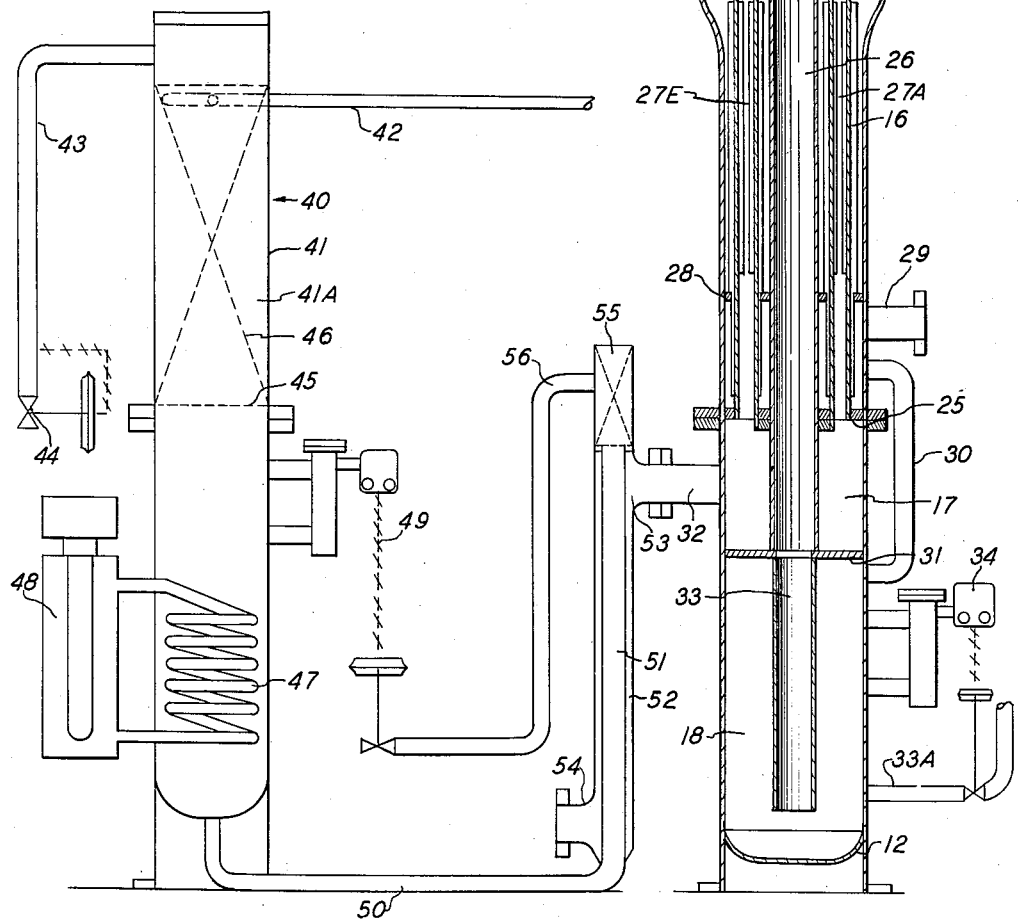
Fig. 3 is a sectional elevation of the refrigerating rectifier shown in conjunction with a schematic representation of a stabilizing column.

With reference to Figs. 1, 2 and 3, a refrigerating rectifier 10 comprises an elongate vertical shell 11 formed through the use of 12¾" O.D. pipe. The outer shell is conveniently assembled in three sections, the sections being joined together by flanges to produce a column approximately 44 feet in height. A lower internal cap 12 joined to the inside wall of the shell near the bottom of the rectifier, an upper external cap 13 joined to the top of the rectifier and the shell define a fluid-tight enclosure 14 extending substantially the entire length of the rectifier.

For descriptive purposes, it is convenient to consider the enclosure as subdivided into four sections, which are designated as a refrigerating section 15, a pre-cooling section 16, a gas outlet section 17, and a liquid-collecting section 18.

The refrigerating section is bounded at its upper longitudinal end by the upper external cap of the rectifier and at its lower longitudinal end by a gas distribution header 19. The gas distribution header is a doughnut-shaped member with a hollow interior. Its outside diameter is less than the inside diameter of the shell. It is joined to the inner wall of the shell by brackets so that an annular space for the passage of fluids is formed between the outer wall of the header and the inner wall of the shell. To avoid excessive pressure drops and cooling of the flowing gas as occurs during flow through small orifice areas, the shell in the preferred embodiment is belled outwardly to provide an adequate cross-sectional area for the flow of fluids. The upper side of the gas distribution header can be downwardly inclined toward the hole of the doughnut to improve liquid drainage. A strip 20 is joined to the periphery of the header on the upper side to facilitate collection of liquid condensate.

A gas downcomer 21 is disposed coaxially with the shell and centrally within the refrigerating section. The gas downcomer is a pipe open at the top and capped at the bottom and has an outside diameter substantially less than the inside diameter of the shell. The gas downcomer is supported by three tubes 22, 22A and 22B, the latter not being shown, extending laterally and downwardly from near the bottom of the downcomer to the top of the gas distribution header. The tubes provide means for flow of fluids from the interior of the downcomer into the interior of the gas distribution header.

An upper refrigerating system 23 and a lower refrigerating system 24, each system being joined to separate refrigeration units located exteriorly of the rectifier, are disposed in the refrigerating section of the rectifier within the annular space formed between the gas downcomer and the inner wall of the shell. Each refrigeration system includes an outer helically-wound coil and an inner helically-wound coil. Each outer coil is formed of 1⅜" copper tubing formed in a helix having a diameter of 10⅛" and comprises approximately 150 feet of tubing in 54 turns. Each inner coil is formed of 1⅛" copper tubing formed in a helix having a diameter of 6⅝" and comprising approximately 144 feet of tubing in 77 turns. This arrangement of the refrigeration coils has been found preferred since maximum heat transfer is attained with minimum plugging of the flow channels between the coils due to gas hydrate formation. A conventional refrigerant flows through each of the coils.

The pre-cooling section of the rectifier is bounded at its upper longitudinal end by the gas distribution header and at its lower end by a tube sheet 25. The periphery of the tube sheet is joined to the inner wall of the shell thereby sealing this section from the lower sections of the rectifier. A liquid downcomer 26 is disposed coaxially with, and centrally within, the shell. At its upper end, the liquid downcomer passes through the gas distribution header and terminates on the upper side of the header. The liquid downcomer centrally passes through the tube sheet, a fluid-tight seal being formed between the outer wall of the downcomer and the tube sheet.

Nine heat exchanger tubes 27, 27A, 27B, 27C, etc., are arcuately spaced in the annular space within the pre-cooling section formed between the liquid downcomer and the inner wall of the shell. The upper end of each tube is joined to the bottom side of the gas distribution header so as to connect the interior of the header with the interior of the tube. The lower end of each tube passes through the tube sheet and terminates on the bottom side of the tube sheet. A fluid-tight seal is formed between the exterior of each tube and the tube sheet. Between the gas distribution header and the tube sheet, the tubes pass through a baffle plate 28. The baffle plate is located slightly above a feed gas inlet pipe 29 and acts to distribute the incoming feed gas throughout the annular space of the pre-cooling section.

As particularly shown in Fig. 2, the heat exchanger tubes pass through holes in the baffle plate, the holes being slightly larger in diameter than the outside diameter of the tubes. The feed gas passes through these annular spaces between the tubes and the baffle plate since the baffle plate is sealed at its outer diameter to the inner wall of the shell and at its inner diameter to the outer wall of the liquid downcomer. The flow area may be increased by providing an annular opening between the baffle plate and the shell. The flow area required may be easily calculated as a function of the feed gas throughput.

In the preferred embodiment of the rectifier of the invention, 1.9" O.D. aluminum tubes, each having 28 external and 14 internal fins, are used to provide optimum heat transfer. However, the internal fins are reamed from the tubes for a short distance above and below the point where the tubes pass through the baffle plate. This is done to prevent excessive cooling of the feed gas in the vicinity of the baffle plate and thereby to avoid gas hydrate formation at that point.

A liquid level pipe 30 is fitted through the shell at a point slightly above the tube sheet and below the feed gas inlet pipe. It externally connects the lower portion of the pre-cooling section and the liquid collecting section of the rectifier and maintains a constant liquid level within the former section.

The gas outlet section of the rectifier is bounded at the upper longitudinal end by the tube sheet and at the lower longitudinal end by a support plate 31. The periphery of the support plate is joined to the inner wall of the shell thereby sealing this section from the liquid collecting section below. The liquid downcomer passes centrally through the support plate and terminates on its bottom side. A gas outlet pipe 32 passes through the shell and connects the gas outlet section with an external dry gas storage or transmission facilities. As previously described, the bottom ends of the heat exchanger tubes terminate on the bottom side of the tube sheet so that any fluid flowing downwardly through the heat exchanger tubes is discharged into the gas outlet section.

The liquid collecting section is bounded at the upper longitudinal end by the support plate and at the lower longitudinal end by the lower internal cap. As previously described, the liquid downcomer passes centrally through the support plate so that liquid condensate drains into the liquid collecting section. For convenience, a drain pipe 33, having a smaller diameter than the downcomer, depends into the section. The liquid level pipe permits any liquids condensed within the pre-cooling section to drain into the liquid collecting section. A liquid outlet pipe 33A is fitted through the shell near the bottom of the liquid collecting section. A level control valve 34 is also provided in this section.

While the apparatus for the stabilization of liquid hydrocarbon products produced in the treatment of wet natural gas by the rectifier of the invention does not form a part of the invention, an apparatus which can be advantageously used in conjunction with the apparatus of the invention is schematically shown in Figure 3. A stabilizing column 40 comprises an outer shell 41 suitably capped at top and bottom to form a fluid-tight enclosure 41A extending the entire length of the column. A stabilizer liquid feed inlet pipe 42 is fitted through the shell near the top of the column. A stabilizer gas outflow pipe 43, equipped with a pressure relief valve 44, is also fitted through the shell near the top of the column. A support ring 45 is joined to the inner wall of the shell at a point approximately midway of the length of the column. This ring provides support for packing 46, such as saddles or Raschig rings, which substantially fills the upper one-half of the enclosure.

A heating coil 47 is placed near the bottom of the enclosure and is connected to an external heating means 48 such as an electric boiler. A liquid level control device 49 is fitted through the shell so as to maintain the liquid level within the enclosure above the top of the heating coil.

A liquid outlet pipe 50 is fitted through the shell at the bottom of the enclosure. The liquid outlet pipe is adapted to a vertical standpipe 51 which is enclosed by an outer jacket 52. The outer jacket is provided with an inlet fitting 53 and an outlet fitting 54 adapted so that dry natural gas from the rectifier passes through the jacket in its flow to transmission lines. In this manner, the dry gas is utilized to cool the hot liquid stabilized product from the stabilizing column. The top of the standpipe is fitted to an enlarged section 55 which is filled with packing designed to impede the flow of water. In this manner, the standpipe is maintained full of water through which the liquid hydrocarbon product bubbles. The turbulence produced by bubbling the hydrocarbon product through the water column improves the heat transfer between the gas flowing through the outer jacket and the liquid hydrocarbon product flowing within the standpipe. The liquid hydrocarbon product flows from the enlarged section of the standpipe into a transfer pipe 56 leading to liquid product storage.

The operation of the rectifier of the invention in the treatment of wet natural gas and the nature of the process of the invention will be understood by tracing the flow of wet natural gas through the preferred embodiment of the rectifier previously described. In Fig. 1, the path of up-flowing gas is indicated by solid arrows while the path of down-flowing gas is indicated by broken arrows. It is to be understood, however, that the process of the invention is not limited to the rectifier described but may be carried out in other suitable equipment.

To demonstrate the heat and material balances existing in the treatment of the wet natural gas, a wet gas at specific conditions of pressure and temperature is taken. While wet gases at other conditions of pressure and temperature may be similarly processed, the temperature distribution of such other gases will differ from that described in the specific illustration in accordance with the initial conditions of the gas. Further, for convenience of description, the treatment of the gas and the liquid condensation products, both water and hydrocarbons, will be separately considered even through such treatment occurs simultaneously during flow through the rectifier.

A wet natural gas entering the feed gas inlet pipe at a pressure of 500 p.s.i.g and a temperature of 100° F. and substantially water-saturated contains about 100 pounds water per million cubic feet and has a gas hydrate temperature of 55° F. The hydrate temperature refers to the temperature at which hydrocarbon products combine with water to form a solid product.

The wet gas enters the pre-cooling section of the rectifier and is distributed uniformly throughout the annular space of that section by the baffle plate. The gas flows upwardly around the heat exchanger tubes, then through the annular space between the gas distribution header and the inner wall of the shell, and upwardly around the refrigerated coils of the refrigerating section. At the top of the refrigerating section, the gas has been cooled and dehydrated to the maximum extent reached during the treatment. The gas then flows successively downwardly through the gas downcomer, and, after being distributed in the gas distribution header, through the heat exchanger tubes ino the gas outlet section. From the gas outlet section, it passes through the gas outlet pipe of the rectifier to storage or gas transmission facilities.

Within the pre-cooling section, once the rectifier has been placed on steam, wet gas is flowing upwardly on the outside of the heat exchanger tubes and is being cooled by cold wet gas flowing downwardly on the inside of the tubes. The resultant heat transfer reduces the temperature of the wet gas from its initial temperature of 100° F. to a temperature of 35° F. as it leaves the pre-cooling section. However, the design is such that the hydrate temperature of 55° F. is not reached until after the gas passes through the holes of the baffle plate. In this manner, gas hydrate formation does not block the flow channels through the baffle plate but occurs upwardly of the baffle plate where no substantial interference with flow results.

As a result of the pre-cooling, approximately 90% of the water within the gas is condensed in the pre-cooling section. It has been found that approximately 80% of the water condensed in thep re-cooling section is drained off while the remaining 20% clings to the coils as a hydrate. In addition, of the hydrocarbon constituents of the natural gas removed during the treatment of the wet gas, approximately the following percentages are condensed in the pre-cooling section: 90% of the heptanes and heavier, 70% of the hexane, 40% of the pentanes, 40% of the butanes and 40% of the propane.

The pre-cooled gas then flows across the refrigerated coils of the refrigerating section. The gas enters this section at a temperature of about 35° F. and is cooled to a temperature of about 10° F. after passing over the coils. The remainder of the condensable hydrocarbons are removed from the gas in this section. At the top of the refrigerating section, the water content of the gas is approximately 5 pounds per million cubic feet so that about 95% of the water initially present in the gas is removed by the treatment. This concentration of water is well within the limits acceptable for transmission of the gas in pipelines.

The cold dry gas then passes into the gas downcomer and, in flowing downwardly, acts to pre-cool the incoming wet feed gas in the manner previously described. The water content remains constant since the gas is superheated with respect to its remaining water. When it reaches the gas outlet pipe, the gas is at a temperature of about 85° F.

Liquid condensation occurs in both the pre-cooling section and the refrigerating section. In the pre-cooling section, the condensed hydrocarbon constituents and water are collected on the top of the tube sheet and overflow into the liquid collecting section through the liquid level pipe. The hydrocarbon constituents are condensed throughout the length of the pre-cooling section and flow downwardly counter to the upflowing warm wet feed gas. As a result, a continuous process of fractionation and stripping occurs by which the high vapor-pressure components are stripped from the hydrocarbon condensate.

The hydrocarbon constituents condensed in the refrigerating section are collected on the upper surface of the gas distribution header. The small amount of water condensed in this section clings to the refrigerating coils as a hydrate. The hydrocarbon liquid flows downwardly by gravity through the liquid downcomer into the liquid collecting section. The downflowing liquid flows as a film along the inner wall of the downcomer, thereby promoting maximum heat transfer efficiency. Since the liquid downcomer is externally surrounded by the upflowing warm feed gas, a heat exchange occurs through the wall of the downcomer between the gas and the film of condensed liquids. In this manner, high vapor pressure components are removed from the downflowing hydrocarbon condensate while the upflowing feed gas is simultaneously cooled.

For further stabilization of the hydrocarbon condensate, the liquid products flow from the liquid collecting section through the liquid outlet pipe into the top of the stabilizing column. Stripping of the hydrocarbon condensate occurs as is flows downwardly through the packing in the column counter-current to upflowing hot vapors produced by heating of the liquid in the bottom of the stabilizer. The stabilized hydrocarbon liquid and water pass from the stabilizing column to storage by the means previously described in connection with the description of the stabilizing column. The gas recovered in the stabilizing column is re-cycled to the rectifier with the feed gas.

The data presented in the table below demonstrate the effectiveness of the treatment according to the invention in removing from wet natural gas those hydrocarbon compounds most valuable as constituents of natural gasoline. Comparable data are presented for a conventional low-temperature recovery process. The percent yield refers to the percentage of the particular compound removed based on the total amount of that compound initially present in the wet gas.

| Compound | Percent Yield | |
| --- | --- | --- |
| | Invention | Conventional |
| Propane | 5 | 17 |
| Butanes | 20 | 40 |
| Pentanes | 70 | 75 |
| Hexanes | 96 | 91 |
| Heptanes and heavier | 99 | 97 |

The above data reveal that treatment in the apparatus of the invention improves the recovery of the heavier hydrocarbon constituents of natural gas, namely hexanes and heptanes and heavier, as compared to recovery of these constituents by a conventional treating method. These constituents are most desirable in natural gasoline. On the other hand, recovery of the lighter hydrocarbon constituents, namely propane and butanes, is considerably less, a particularly desirable result since the lighter hydrocarbon constituents must later be removed from the natural gasoline. Therefore, while only two-thirds as much total liquid hydrocarbon product is recovered in the apparatus of the invention, the difference in recovery is found in those hydrocarbon constituents which are not desirable in natural gasoline.

As indicated in connection with the description of the treatment of a wet gas, gas hydrate formation occurs during the process of treatment. The hydrates formed cling to the heat exchanger tubes and the refrigerated coils, thereby decreasing the efficiency of heat transfer. To "defrost" these heat exchange surfaces, the refrigeration equipment used in conjunction with the rectifier of the invention has been adapted so that it acts as a heat pump for certain intervals during the treating process. Through an automatically-timed cycle, hot gaseous refrigerant is pumped through the refrigerated coils for 15 minutes in every twelve hour period of operation. In this manner, without interruption of wet gas flow, the heat exchange surfaces are kept free of excessive build-up of gas hydrates.

It is apparent that modifications of the rectifier of the invention may be made without departing from the basic concept of the invention. For example, a suitable baffle arrangement may be placed above the gas distribution header so that liquid products condensed in the refrigerating section are caused to flow downwardly through the upflowing wet gas instead of through the liquid downcomer. Such flow would increase the pentane content of the final hydrocarbon liquid product without requiring an increase in the refrigeration capacity.

Similarly, consistent with the requirements of heat and material balances, modifications of the arrangement of heat exchanger tubes and the refrigerated coils may be made. The flow arrangement through the baffle plate within the pre-cooling section may also be modified.

The rectifier of the invention provides a compact process unit for the treatment of wet natural gas. Both water and natural gasoline are effectively removed from the wet gas. By providing for an automatically-timed thaw cycle, the rectifier may be continuously operated with a minimum of supervision. Furthermore, by adapting the principles of the rectifier, units may be built of various throughput capacities. This factor, coupled with the intrinsic economy achieved by the consolidation of treating steps, causes the rectifier to be adaptable for use in gas fields of limited productive capacity as well as in fields of greater capacity.

I claim:

1. Apparatus for the treatment of natural gas comprising an elongate vertical shell closed at its longitudinal ends to form a fluid-tight enclosure, a tubular liquid downcomer disposed coaxially within the shell to form a first annular space between the shell and the liquid downcomer for a part of the height of the shell, a support plate joined to the periphery of the liquid downcomer at its bottom end to form a liquid collecting section longitudinally bounded by the support plate and the bottom closure of the shell, a tube sheet joined to the periphery of the liquid downcomer above the support plate to form an annular gas outlet section longitudinally bounded by the tube sheet and the support plate, a tubular gas downcomer disposed coaxially within the shell above the liquid downcomer to form a second annular space between the shell and the gas downcomer, the first annular space and the second annular space being in flow communication, first tubular heat-exchanging means disposed in the first annular space, the interior of the first heat exchanging means being in flow communication with the gas outlet section, second tubular heat exchanging means disposed in the second annular space and adapted to receive interiorly a refrigerating fluid, a feed gas inlet above the tube sheet for admitting feed gas into the first annular space whereby the feed gas passes upwardly across the exteriors of the first and second heat-exchanging means respectively connecting means joining the interior of the gas downcomer with the interior of the first heat exchanging means, a gas outlet fitted through the shell into the gas outlet section, and a liquid outlet fitted through the shell into the liquid collecting section.

2. Apparatus in accordance with claim 1 wherein the first heat exchanging means comprises a plurality of heat-exchanging tubes, arcuately disposed in the first annular space, the upper longitudinal end of the tubes being interiorly joined to the connecting means joined to the gas downcomer and the lower longitudinal end of the tubes passing through the tube sheet and terminating in the gas outlet section.

3. Apparatus in accordance with claim 1 wherein the second heat exchanging means comprises a plurality of helically-wound coils of tubing, each coil being joined to a source of refrigerating fluid exterior of the enclosure.

4. Apparatus in accordance with claim 1 wherein the second heat exchanging means comprises a first refrigerating system and a second refrigerating system, each system comprising a first and second coil of tubing helically-wound around the gas downcomer, the first coil of tubing having a helix diameter less than the diameter of the shell and greater than the helix diameter of the second coil of tubing, the second coil of tubing having a helix diameter greater than the outer diameter of the gas downcomer.

5. Apparatus in accordance with claim 1 wherein the bottom of the first annular space is joined to the liquid collecting section by means providing flow communication.

6. Apparatus for the treatment of natural gas comprising an elongate vertical shell closed at its longitudinal ends to form a fluid-tight enclosure, a tubular liquid downcomer disposed coaxially within the shell to form a first annular space between the shell and the liquid downcomer for a part of the height of the shell, a support plate joined to the periphery of the liquid downcomer at its bottom end to form a liquid collecting section longitudinally bounded by the support plate and the bottom closure of the shell, a tube sheet joined to the periphery of the liquid downcomer above the support plate to form an annular gas outlet section longitudinally bounded by the tube sheet and the support plate, a tubular gas downcomer disposed coaxially within the shell above the liquid downcomer to form a second annular space between the shell and the gas downcomer, the first annular space and the second annular space being in flow communication, a feed gas inlet above the tube sheet for admitting feed gas into the first annular space, a baffle plate disposed in the first annular space above the feed gas inlet to distribute upflowing feed gas throughout the annular space, a plurality of heat-exchanging tubes arcuately disposed in the first annular space, the interiors of the heat-exchanging tubes being in flow communication with the gas outlet section, a plurality of helically-wound coils disposed around the gas downcomer in the second annular space, a gas distribution header joining the interior of the gas downcomer with the interiors of the heat-exchanging tubes, a gas outlet fitted through the shell into the gas outlet section and a liquid outlet fitted through the shell into the liquid collecting section.

7. Apparatus for the treatment of a stream of natural gas comprising an elongate vertical shell closed at its longitudinal ends to form a fluid-tight enclosure, a feed gas inlet for admitting feed gas to the enclosure, first tubular heat-exchanging means within the enclosure, second tubular heat-exchanging means within the enclosure above the first heat-exchanging means and adapted for receiving interiorly a refrigerating fluid independent of the natural gas stream, means for directing feed gas upwardly across the exteriors of the first and second heat-exchanging means successively, means adapted for transmitting gas passing across the second heat-exchanging means into the interior of one end of the first heat-exchanging means, means disposed below the second heat-exchanging means for directing substantially all of the liquids condensed from the gas passing across the second heat-exchanging means downwardly in counter-current heat-transfer relationship with the feed gas and out of heat-transfer relationship with the second heat-exchanging means, a gas outlet in flow communication with the interior of the other end of the first heat-exchanging means, and a liquid outlet in the lower part of the enclosure.

8. Apparatus for the treatment of natural gas comprising an elongate vertical shell closed at its longitudinal ends to form a fluid-tight enclosure, a loquid downcomer disposed coaxially within the shell to form a first annular space between the shell and the liquid downcomer for a part of the height of the shell, a gas downcomer disposed coaxially within the shell above the liquid downcomer to form a second annular space between the shell and the gas downcomer, first tubular heat-exchanging means disposed in the first annular space, the interior of the first heat-exchanging means joined at one end in flow communication with the gas downcomer, second tubular heat-exchanging means disposed in the second annular space and adapted to receive interiorly a refrigerating fluid, a feed gas inlet for admitting feed gas to the first annular space, means adapted to the liquid downcomer below the feed gas inlet for sealing the upper portion of the first annular space from the lower part of the enclosure, whereby the feed gas passes upwardly across the exteriors of the first and second heat-exchanging means successively, means for directing gas passing across the second heat-exchanging means into the upper end of the gas downcomer, a gas outlet joined in flow communication with the interior of the first heat-exchanging means at its other end, and a liquid outlet in the lower part of the enclosure.

9. In combination with a stabilizing column having a liquid inlet and a stabilized liquid outlet provided with an exterior jacket, apparatus for the treatment of a stream of natural gas comprising an elongate vertical shell closed at its longitudinal ends to form a fluid-tight enclosure, a feed gas inlet for admitting feed gas to the enclosure, first tubular heat-exchanging means within the enclosure, second tubular heat-exchanging means within the enclosure above the first heat-exchanging means and adapted for receiving interiorly a refrigerating fluid independent of the natural gas stream, means for directing feed gas upwardly across the exterior of the first and second heat-exchanging means successively, means adapted for transmitting gas passing across the second heat-exchanging means into the interior of one end of the first heat-exchanging means, means disposed below the second heat-exchanging means for directing substantially all of the liquids condensed from the gas passing across the second heat-exchanging means downwardly in counter-current heat-transfer relationship with the feed gas and out of heat-transfer relationship with the second heat-exchanging means, a gas outlet in flow communication at one of its ends with the interior of the other end of the first heat-exchanging means and joined at its other end to the exterior jacket around the stabilized liquid outlet of the stabilizing column, and a liquid outlet joined to the liquid inlet of the stabilizing column.

10. A process for the treatment of a stream of wet natural gas to remove water and condensable hydrocarbons comprising the steps of cooling the warm wet gas by flowing it upwardly across a precooling heat exchanger to remove substantially all the water and part of the condensable hydrocarbons, further cooling the gas by flowing it upwardly across a refrigerating heat exchanger to produce a dry gas by removing substantially all of the remaining water and remaining condensable hydrocarbons, cooling the refrigerating heat exchanger with a refrigerant independent of the gas stream, passing the cold dry gas through the pre-cooling heat exchanger in indirect heat exchange with the wet gas, and simultaneously flowing substantially all of the condensed hydrocarbons out of heat-transfer relationship with the refrigerating heat exchanger and downwardly in heat-transfer relation with and counter to the flow of warm wet gas to cause it to volatize the relatively high vapor pressure hydrocarbon constituents from the condensed hydrocarbons.

11. Process in accordance with claim 10 wherein the hydrocarbons condensed from the gas flowing across the refrigerating heat exchanger are separated from the counter-flowing natural gas by a heat-exchanging wall.

12. Process in accordance with claim 10 wherein the hydrocarbons condensed from the gas flowing across the refrigerating heat-exchanger intimately mix with the counter-flowing natural gas.

References Cited in the file of this patent

UNITED STATES PATENTS

| | | |
|---|---|---|
| 1,562,915 | Recordon et al. | Nov. 24, 1925 |
| 1,620,192 | Claude | Mar. 8, 1927 |
| 1,878,123 | Etienne | Sept. 20, 1932 |
| 1,894,180 | Lantz | Jan. 10, 1933 |
| 1,994,110 | Pittman | Mar. 12, 1935 |
| 2,122,238 | Pollitzer | June 28, 1938 |
| 2,135,319 | Bays | Nov. 1, 1938 |
| 2,475,957 | Gilmore | July 12, 1949 |

UNITED STATES PATENT OFFICE
CERTIFICATION OF CORRECTION

Patent No. 2,964,915 December 20, 1960

Raymond James Hull

It is hereby certified that error appears in the above numbered patent requiring correction and that the said Letters Patent should read as corrected below.

Column 6, line 35, for "steam" read -- stream --; line 37, strike out "wet".

Signed and sealed this 6th day of June 1961.

(SEAL)
Attest:

ERNEST W. SWIDER
Attesting Officer

DAVID L. LADD
Commissioner of Patents